(12) United States Patent
Sussland et al.

(10) Patent No.: US 8,213,620 B1
(45) Date of Patent: Jul. 3, 2012

(54) METHOD FOR MANAGING CRYPTOGRAPHIC INFORMATION

(75) Inventors: Robert J. Sussland, San Francisco, CA (US); Ravi Kavuri, Inver Grove Heights, MN (US); Gaurav Agarwal, Menlo Park, CA (US)

(73) Assignee: Netapp, Inc., Sunnyvale, CA (US)

( * ) Notice: Subject to any disclaimer, the term of this patent is extended or adjusted under 35 U.S.C. 154(b) by 436 days.

(21) Appl. No.: 12/272,162

(22) Filed: Nov. 17, 2008

(51) Int. Cl.
*H04L 9/08* (2006.01)

(52) U.S. Cl. ........... 380/278; 713/160; 713/193; 726/26

(58) Field of Classification Search .................. 380/278
See application file for complete search history.

(56) References Cited

U.S. PATENT DOCUMENTS

| | | | |
|---|---|---|---|
| 5,343,524 A | 8/1994 | Mu et al. | |
| 6,233,543 B1 | 5/2001 | Butts et al. | |
| 6,336,186 B1 * | 1/2002 | Dyksterhouse et al. | 713/156 |
| 6,915,434 B1 * | 7/2005 | Kuroda et al. | 713/193 |
| 7,593,620 B2 | 9/2009 | Surcouf et al. | |
| 7,822,685 B1 | 10/2010 | O'Toole, Jr. | |
| 2002/0176576 A1 * | 11/2002 | Abe et al. | 380/227 |
| 2003/0120611 A1 | 6/2003 | Yoshino et al. | |
| 2005/0018849 A1 | 1/2005 | Rodriguez et al. | |
| 2006/0150251 A1 * | 7/2006 | Takashima et al. | 726/26 |
| 2007/0005795 A1 | 1/2007 | Gonzalez | |
| 2007/0055894 A1 * | 3/2007 | Osaki | 713/193 |
| 2007/0079117 A1 * | 4/2007 | Bhogal et al. | 713/160 |
| 2008/0049971 A1 | 2/2008 | Ramos et al. | |
| 2008/0098480 A1 | 4/2008 | Henry et al. | |
| 2008/0104260 A1 | 5/2008 | Klemba et al. | |
| 2009/0006850 A1 | 1/2009 | Birger et al. | |
| 2009/0092252 A1 | 4/2009 | Noll et al. | |
| 2009/0100516 A1 | 4/2009 | Ray et al. | |
| 2009/0116650 A1 | 5/2009 | Cizas et al. | |
| 2010/0220364 A1 | 9/2010 | Picard et al. | |

OTHER PUBLICATIONS

Michener, J.R.; Acar, T.;, "Security domains: key management in large-scale systems," Software, IEEE, vol. 17, No. 5, pp. 52-58, Sep./Oct. 2000.*
T. Dierks, 'The Transport Layer Security (TLS) Protocol', Version 1.2, RFC 5246, Aug. 2008.*
Non-Final Office Action on co-pending (U.S. Appl. No. 12/272,169) dated Sep. 13, 2011.
Final Office Action on co-pending (U.S. Appl. No. 12/272,169) dated Feb. 15, 2012.

* cited by examiner

*Primary Examiner* — Carl Colin
*Assistant Examiner* — Syed Zaidi
(74) *Attorney, Agent, or Firm* — Klein, O'Neill & Singh, LLP (57) ABSTRACT

Method for distributing encryption keys stored by a centralized key manager, operationally coupled to a first encryption device and the second encryption device is provided. The first encryption device and the second encryption device may request the CKM to provide the stored encryption keys in different formats and each encryption device may use a different encryption format to encrypt information. If the encryption devices are authorized to receive the stored encryption keys, then the CKM prepares the requested keys in different formats and provides them to the encryption devices.

19 Claims, 7 Drawing Sheets

METHOD FOR MANAGING CRYPTOGRAPHIC INFORMATION

CROSS-REFERENCE TO RELATED APPLICATION

This application is related to U.S. patent application, entitled "SYSTEM FOR MANAGING CRYPTOGRAPHIC INFORMATION", Ser. No. 12/272,169 filed on even date herewith, the disclosure of which is incorporated herein by reference in its entirety.

BACKGROUND

1. Technical Field

The present disclosure relates to managing cryptographic information.

2. Related Art

Electronic information is commonly stored in storage devices in a storage system that typically includes one or more storage devices. The storage system may be implemented in accordance with a variety of storage architectures including, but not limited to, a network-attached storage ("NAS") environment, a storage area network ("SAN") and a disk assembly directly attached to a client or host computer.

The storage system typically includes a storage operating system that organizes the stored information. The storage operating system may implement a high-level module, for example, a file system, to logically organize information stored on storage volumes as a hierarchical structure of data containers, such as files and logical units.

As the use of electronic information increases so are the security concerns surrounding stored data. Continuous efforts are being made to first encrypt and then store data in storage devices. Stand-alone encryption devices are now being used to encrypt data as data moves between computing systems/devices and storage devices. The encryption devices use encryption keys to protect data and then use dedicated key manager devices to manage the keys. Managing encryption keys with dedicated key managers has various challenges.

In conventional systems, most encryption devices operate with proprietary key management systems using different encryption key formats. For example, a laptop encryption system; office document encryption system; tape library encryption system; file system encryption system and electronic mail encryption system may all use different encryption formats and often use dedicated key management systems.

Typically, an encryption device uses a dedicated key management system for maintaining permissions, governing key access, key backup, key archival procedures, client management procedures, monitoring, update, disaster recovery mechanisms and other functions. Most key repositories use a proprietary protocol to provide key management services. Since multiple devices/encryption systems are used today for storing and managing information, the cost of these dedicated, individual key management systems can be prohibitive. Furthermore, it makes it very difficult to inter-operate and centrally manage the encryption keys used for securing data.

It is desirable to have a uniform centralized key management system that allows one to centrally manage keys that are originated by different encryption devices without the need for individual key managers.

Any enterprise server system should be able to support an automated mechanism of replicating encryption keys to remote servers. In part, this is to support data center mirroring, and to support geographically diverse locations. Therefore, it is desirable to have a centralized key management system that is able to replicate keys to different business units based on their needs. Conventional systems today do not provide this service because they are inflexible and mostly proprietary.

It is also desirable to store keys from multiple encryption devices in different formats and be able to automatically and safely retrieve keys from a centralized key manager. Since most key management systems are proprietary, they do not offer this flexibility across different operating platforms/formats.

SUMMARY

In one embodiment, a method for distributing encryption keys stored by a centralized key manager ("CKM"), operationally coupled to a first encryption device and the second encryption device is provided. The first encryption device and the second encryption device may request the CKM to provide the stored encryption keys in different formats and each encryption device may use a different encryption format to encrypt information. If the encryption devices are authorized to receive the stored encryption keys, then the CKM prepares the requested keys in different formats and provides them to the encryption devices.

In another embodiment, a method for storing encryption keys with the CKM operationally coupled to at least a first encryption device and a second encryption device is provided, where the first encryption device and the second encryption device may use a different encryption format to encrypt information. Upon receiving encryption keys from the encryption devices, the CKM inserts a key sharing group label, based on which the received encryption keys are replicated and shared. The received keys are wrapped (or secured) with other keys that are selected based on configuration information for the encryption devices maintained by the CKM. The wrapped encryption keys may be stored in different formats, based on the configuration information.

In another embodiment, a method for distributing encryption keys stored by a CKM operationally coupled to at least a first encryption device and a second encryption device is provided. The stored encryption key is prepared such that the requested encryption key is presented to the first encryption device in a first format, in response to a request from the first encryption device for an encryption key stored by the CKM and based on a first attribute from among a plurality of attributes, associated with the first encryption device. The first attribute defines the first format. If the first encryption device is authorized to receive the stored encryption key in the first format, then the requested encryption key is transmitted to the first encryption device in the first format.

In yet another embodiment, a method for distributing encryption keys stored by the CKM operationally coupled to at least a first encryption device and a second encryption device is provided. In response to a request from the first encryption device for an encryption key stored by the CKM, the requested encryption key is wrapped with a key stored in a CKM database. The key used for wrapping the requested encryption key is selected based on a first attribute associated with the first encryption device. If the first encryption device is authorized to receive the stored encryption key in the first format, then the requested key is transmitted to the first encryption device in the first format.

The CKM uses a key sharing group label, a second attribute associated with the first encryption device, to replicate and share the requested encryption key.

The CKM performs the foregoing steps in response to a second request from the second encryption device for another stored encryption key in a second format.

In yet another embodiment, a method for storing encryption keys with a CKM operationally coupled to at least a first encryption device and a second encryption device is provided. The method includes:

(a) inserting a key sharing group label in an encryption key object received by the CKM from the first encryption device, based on which the received encryption key object is replicated and shared;

(b) wrapping the encryption key object based on configuration information stored for the first encryption device; and (c) storing the encryption key object in a first format as defined by the configuration information.

In another embodiment, a method is provided. The method includes:

(a) registering a first encryption device and a second encryption device with a centralized key manager (CKM) for storing and retrieving encryption keys. The first encryption device uses a first format to encrypt data stored at a storage device; and the second encryption device uses a second format to encrypt data stored at the storage device;

(b) storing configuration information regarding the first encryption device and the second encryption device, including (i) a key sharing group label based on which a stored encryption key object is replicated and shared; and (ii) information regarding a type of key that the CKM uses to encrypt encryption key content received from the first encryption device and the second encryption device;

(c) inserting the key sharing group label in an encryption key object received by the CKM from each of the first encryption device and the second encryption device;

(d) wrapping the encryption key object received from the first encryption device and the second encryption device, based on configuration information stored for the first encryption device and the second encryption device; and e) storing the encryption key objects received from the first encryption device and the second encryption device, in different formats.

In yet another embodiment, a CKM is provided that communicates with a plurality of encryption devices regardless of the encryption format the different encryption devices use to encrypt information. Dedicated, proprietary key management solutions for different encryption devices are not needed. This saves cost in managing keys and hence reduces the overall cost of securing data.

In yet another embodiment, using key sharing labels, the CKM is able to handle different level of permissions for stored keys. The access may be based on a hierarchical system that may be similar to a way a business entity is organized.

In another embodiment, keys are automatically stored, replicated and retrieved regardless of what encryption format is used by the encryption device. This makes the overall key management process efficient.

This brief summary has been provided so that the nature of this disclosure may be understood quickly. A more complete understanding of the disclosure can be obtained by reference to the following detailed description of the various embodiments thereof in connection with the attached drawings.

BRIEF DESCRIPTION OF THE DRAWINGS

The foregoing features and other features will now be described with reference to the drawings of the various embodiments. In the drawings, the same components have the same reference numerals. The illustrated embodiments are intended to illustrate, but not to limit the present disclosure. The drawings include the following Figures.

DETAILED DESCRIPTION

The following definitions are provided as they are typically (but not exclusively) used in the computing/cryptography environment, implementing the various adaptive embodiments described herein.

"Authentication Code" means information used in cryptography for authenticating an encryption key or message. Authentication code is typically used with an algorithm that accepts a secret key and an arbitrary-length message to be authenticated as input, and outputs a message authentication code (sometimes known as a tag). The message authentication code protects both a message's data integrity as well as its authenticity, by allowing verifiers (who also possess the secret key) to detect any changes to the message content. Examples of authentication code include Hashed Message Authentication Code-Security Hash Algorithm-1 (HAC-SHA-1), HMAC-SHA-256 and other types of authentication codes. Authentication code may be used for securing encryption keys stored by a key manager, as described herein.

"Encryption" in cryptography means a process for transforming information using an algorithm so that information can be accessed by one who has special knowledge, usually an encryption key. Information that is encrypted using an encryption key is commonly referred to as cipher text, i.e. plain text that has been transformed using an encryption key.

"Encryption Key" means information (or parameter/code) that provides an output for an encryption algorithm. An encryption key, typically, specifies the transformation of plain text into cipher text or vice-versa during decryption. The size of an encryption key is often specified in bits or bytes. The length of an encryption key typically indicates the strength of an encryption key (referred to as "bit strength").

"Encryption format" means the overall encrypt-on process used by an encrypting device to encrypt and decrypt information. Encryption systems are typically grouped into different categories, for example, symmetric encryption systems provided by the Advanced Encryption Standard (AES) asymmetric systems, for example, RSA algorithms (provided by RSA, a division of EMC Corp.) and others. To encrypt information, these different encryption categories may use different type of encryption keys, key sizes and parameters. For example, one encryption device may use checksum code with encryption keys, while another encryption device may not use checksum code. One encryption device may use one type authentication code, for example, HMAC-SHA-1 while another device may use HMAC-SHA-256. In a generic sense the different encryption parameters including encryption format as used by different encryption devices is referred to as "first format", "second format" and so forth.

"Key Content" means content within a Key Object that is provided by an encryption device to the CKM. Key content may be in plain text or ciphered.

"Key Object" (also referred to as encryption Key Object) means a structure/code/information that is passed between a centralized key manager (CKM) and a plurality of encryption devices for storing and retrieving encryption keys, as described below. The Key Object includes a plurality of fields that are described in the specification below.

"Wrapping" means transforming/adding or protecting information, including an encryption key. For example, as described below, when the CKM encrypts an encryption Key Object with authentication code, it may be referred to as "wrapping the Key Object".

In one embodiment, a method for distributing encryption keys stored by a centralized key manager, operationally coupled to a first encryption device and the second encryption device is provided. The first encryption device and the second encryption device may request the CKM to provide the stored encryption keys in different formats and each encryption device may use a different encryption format to encrypt information. If the encryption devices are authorized to receive the stored encryption keys, then the CKM prepares the requested keys in different formats and provides them to the encryption devices.

In another embodiment, a method for storing encryption keys with the CKM operationally coupled to a first encryption device and a second encryption device is provided, where the first encryption device and the second encryption device may use a different encryption format to encrypt information. Upon receiving encryption keys from the encryption devices, the CKM inserts a key sharing group label, based on which the received encryption keys are replicated and shared. The received keys are wrapped (or secured) with other keys that are selected based on configuration information for the encryption devices maintained by the CKM. The wrapped encryption keys may be stored in different formats, based on the configuration information.

System:

As used in this disclosure, the terms "component" "module", "system," and the like are intended to refer to a computer-related entity, either software, hardware, a combination of hardware and software, or software in execution. For example, a component may be, but is not limited to being, a process running on a processor, a processor, an object, an executable, a thread of execution, a program, and/or a computer. By way or illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer executable components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other device, in accordance with the claimed subject matter.

To facilitate an understanding of the various embodiments of the present disclosure, the general architecture and operation of a networked system will first be described. The specific architecture and operation of the various embodiments will then be described with reference to the general architecture.

Figure 1A:
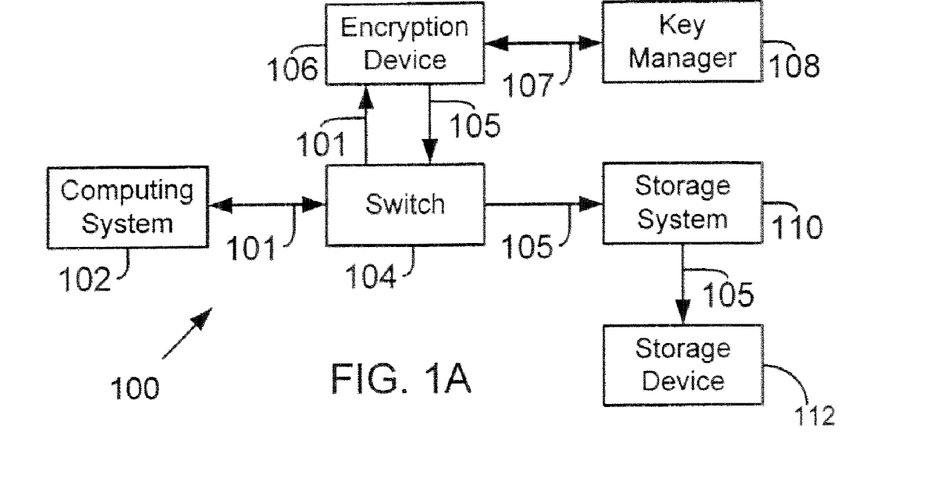
FIG. 1A shows an example of a system using a key manager and an encryption device.

FIG. 1A shows a network system 100 using an encryption device 106. System 100 includes a computing system 102 that sends data 101 for storage at storage device 112 coupled to a storage system 110. Data 101 is sent to switch 104 and then sent to encryption device 106. Encryption device 106 uses certain encryption keys to encrypt the data as described below. After encryption, the encrypted data 105 is sent to storage system 110 and stored at storage device 112.

In one embodiment, storage device 112 includes disk drives organized as a disk array, wherein the term "disk" commonly describes a self-contained rotating magnetic media storage device. The term disk in this context is synonymous with hard disk drive (HDD) or direct access storage device (DASD). In another embodiment, storage device 112 includes non-volatile memory, for example, flash memory.

The keys 107 used for encrypting data 101 are sent to key manager 108 for storage and management. It is desirable to maintain and update keys 107 because data can be stored at storage device 112 for a long duration. Dedicated key managers, typically maintain and update keys 107.

Figure 1B:
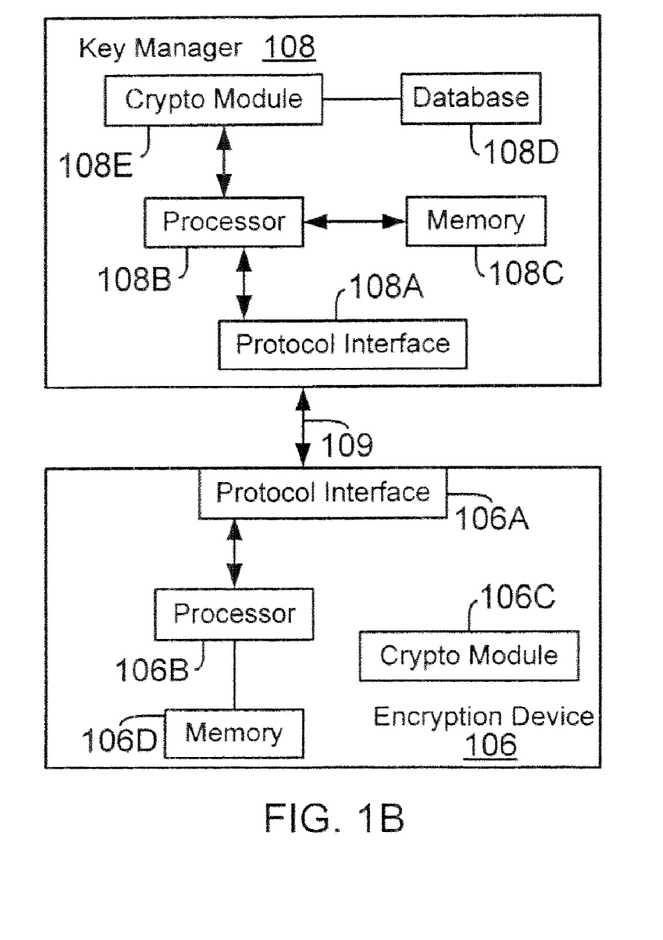
FIG. 1B shows communication between an encryption device and a key manager that is dedicated to the encryption device.

FIG. 1B shows a block diagram of a typical, dedicated key manager 108 and encryption device 106 communicating via a secure connection 109. Encryption device 106 includes a processor 106B that controls the overall operation of encryption device 106 by executing code out of memory 106D. The encryption device 106 also includes a crypto-module 106C that encrypts data 101, which is eventually stored at storage device 112 (FIG. 1A). The term crypto-module as used herein includes hardware, firmware, or a combination thereof, for performing encryption and decryption operations. Crypto-module 106C typically uses proprietary encryption processes/algorithms/keys to encrypt data 101.

Encryption device 106 interfaces with key manager 108 via interface 106A. The structure of interface 106A will depend on the operating environment of encryption device 106. Often, interface 106A is a proprietary interface designed by a vendor that develops and designs encryption device 106.

Key manager 108 includes a protocol interface 108A that interfaces with encryption device 106. Again, the structure of protocol interface 108A depends on the protocol/encryption format used by encryption device 106. Key manager 108 also includes a crypto-module 108E that is used to protect and save encryption keys 107 that are used by encryption device 106. Keys 107 are typically stored in a secured database 108D. A processor 108B having access to memory 108C controls the overall key manager functionality.

Figure 1C:
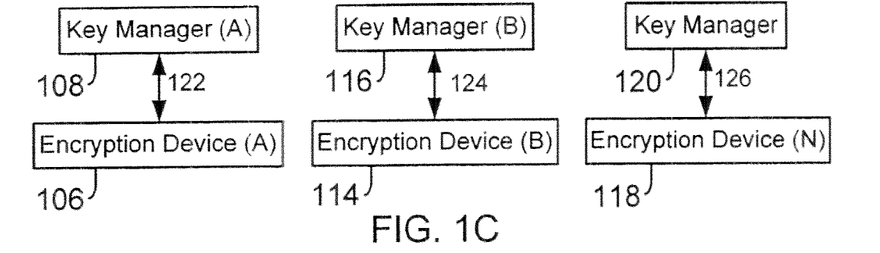
FIG. 1C shows a plurality of key managers that may operate in different environments using different encryption key formats.

Although system 100 shows one encryption device 106, in most network systems more than one encryption device is used. This is shown in FIG. 1C, where N encryption devices (106, 114 and 118 communicate with a plurality of key managers 108, 116 and 120, via connections 122, 124 and 126, respectively.

Key managers 108, 116 and 120 are dedicated to each encryption device 106, 114 and 118, respectively. The plurality of encryption devices are typically provided by different vendors and may operate in different environments for example, a proprietary environment; using standard public key/private keys or any other environment. Because encryption devices may be different, each of the dedicated key managers may have to be customized to properly secure encryption keys 107. This is expensive and cumbersome to manage in modern network.

The following summarizes some of the other challenges faced by conventional key management solutions:

(a) One purpose of a key management system is to protect encryption keys that encrypt data that is stored for a long duration (e.g. data stored on tapes, or other type of media). It is desirable, to protect the encryption keys with high bit strength, for example, bit strength of 236 bits, to prevent unauthorized access to stored information. This can be a problem for key management systems that use weak encryption keys, for example, RSA 1024/2048 algorithms, some of which are scheduled to be retired by NIST in a few years. In one embodiment, a flexible, centralized key management system is provided that can upgrade and maintain encryption keys for longevity, with minimal compromise in security.

(b) Another challenge for conventional key management solutions is interoperability. Information today may be accessed by an application layer, operating system layer, media management layer, and the actual storage media. These layers may reside on several physical devices. Since most key managers are proprietary, they interface with specific layers. In one embodiment, a universal, centralized key management system is provided that can interoperate with application level encryption as well as with disk or tape data encryption.

(c) Conventional key management solutions do not associate keys with data that is encrypted. In some cases, keys are associated only to users (e.g. authentication key material), or devices (e.g. root passwords, or machine specific keys), in which case the key management system should be able to store explicit associations of keys to machines or users. In one embodiment, a centralized key manager associates keys with the encrypted data, so that a user is able to retrieve the appropriate key with knowledge only of the data that has been encrypted.

(d) Conventional key management solutions are typically proprietary in nature and are not flexible to accommodate different key management policies for a plurality of encryption devices. Typically, in conventional systems, the key management policies are "hard-coded" into each encryption device in a proprietary manner, and only the key material, stripped of the associated policy information, is managed by the proprietary key management system.

In conventional solutions, keys from different devices are not managed in a centralized fashion and hence are not associated with key management policies that may establish a retention time for the keys, define an appropriate encryption policy, and key access policy. The inflexible, conventional key management solutions also fail to address the needs of individual encryption devices. In one embodiment, a flexible, centralized key management system is provided that can manage keys for different types of encryption devices. The centralized key management system supports multiple encryption clients, each with their own policies, and is also able to efficiently back up and store the policy data.

(e) Because enterprises are organized hierarchically, key access permissions may not be universal. A key management system should be able to support group based access control based on group membership inheritance. For example, the rights to recover a laptop key may be different from the rights to recover a database backup. However, there may be a central group of users with rights to recover both. This is an example of a hierarchical group based access control system. In one embodiment, a centralized key management system manages keys based on different permission levels. Data is accessible to various business units worldwide, and key management policies vary with the hierarchy that is used within the global network. Without this feature, the key management system will be costly to operate and manage, and will not be able to support a diverse set of encryption clients.

The various embodiments described below solve the various challenges of conventional key management by providing a centralized key manager that can support a plurality of encryption devices, without using dedicated key managers for each encryption device type.

Figure 2:
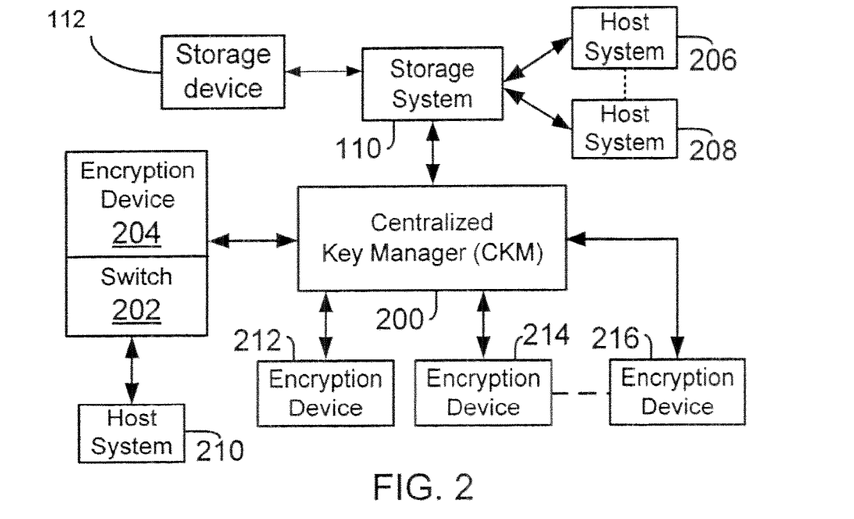
FIG. 2 shows an example of a centralized key manager (CKM) coupled to a plurality of encryption devices, without having to dedicate a key manager for each encryption device, according to one embodiment.

Centralized Key Manager:

FIG. 2 shows a top-level block diagram of a centralized key manager (may also be referred to as CKM) 200 that is coupled to the plurality of encryption devices 212, 214 and 216 that may each operate in different encryption environments using different encryption techniques and protocols. Encryption devices 212, 214 and 216 are similar to encryption devices 106, 114 and 118, except that an agent 322 (described below) is executed by each encryption device 212, 214 and 216 to interface and communicate with CKM 200.

Host system 210 may also be coupled to a switch 202 with encryption device 204. Encryption device 204 in this example is integrated with switch 202 and performs functions similar to encryption device 212, 212 or 216

CKM 200 may also be coupled to storage system 110 that may be operationally coupled to a plurality of host computing systems 206-208. Host systems 206-208 may use storage system 110 to store data at storage device 112. One or more of host systems 206-208 may operate as a network administrator and storage administrator.

The storage system includes a special-purpose computing system that provides various services relating to the organization of information on storage devices, for example, storage disks, flash memory or any other type of storage device. However, it will be understood to those skilled in the art that the inventive embodiments described herein may apply to any type of special-purpose (e.g., server) or general-purpose computer, including a standalone computer.

In one embodiment, the storage system may have a distributed architecture. For example, the storage system may include a storage server that can be implemented with multiple distributed storage servers. It can also include a physically separate network module (e.g., "N-module") and disk module (e.g., "D-module") (not shown), which communicate with other storage servers over an external interconnect. The N-module acts as a front-end of the storage server, exporting services to clients; and the D-module acts as the back-end, managing the underlying storage of the storage server. The N-module and D-module can be contained in separate housings and communicate with each other via network connections. Thus, the N-module and the D-module enable a storage server to be physically separated into multiple modules that can be distributed across a network.

The various components of FIG. 2 will now be described below in more detail with respect to FIGS. 3A-5.

Figure 3A:
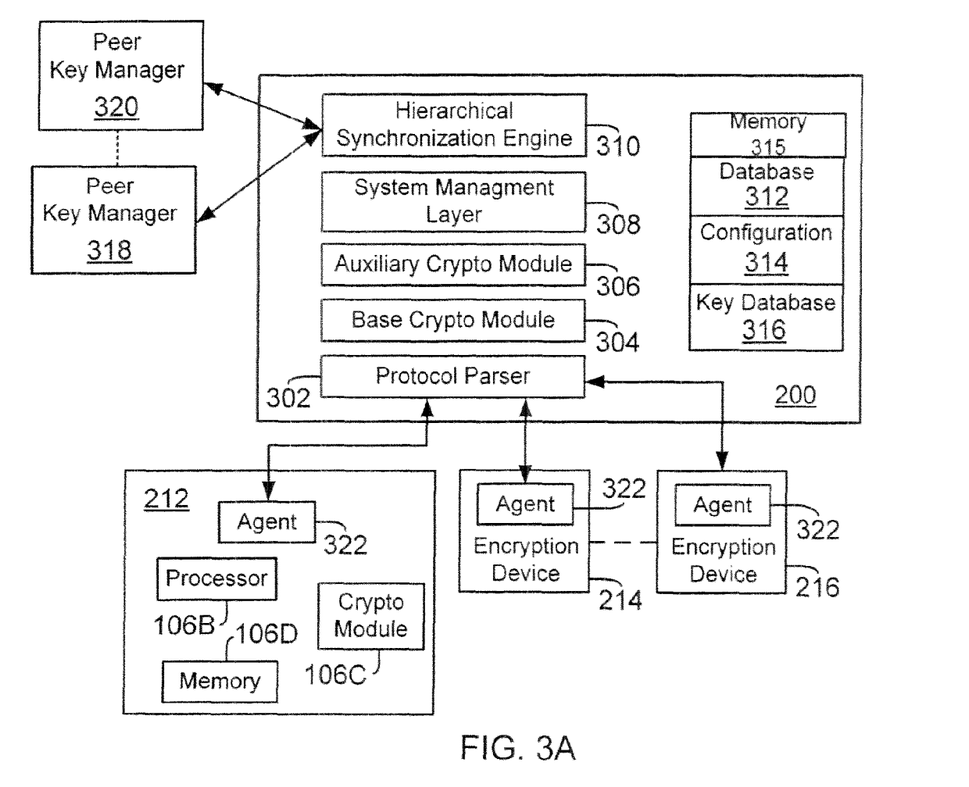
FIG. 3A shows a block diagram of a CKM, according to one embodiment.

FIG. 3A shows a detailed block diagram of CKM 200 that is coupled to a plurality of encryption devices 212, 214 and 216. Encryption devices 212, 214 and 216 may also be referred to herein as "clients" of CKM 200.

Encryption devices 212, 214 and 216 may use different encryption processes/algorithms to encrypt data. For example, encryption device 212 may manage encryption with checksum code; while encryption device 214 may not use any checksum code. By setting attributes for each encryption device in a database (see 312, described below), CKM 200 is able append checksum code for encryption device 212 and not for encryption device 214.

Another example of using a different encryption format may be where encryption device 212 may use authentication code HMAC-SHA-1 to digitally sign encryption keys. Encryption device 216 may use HMAC-SHA-256. CKM 200, by building encryption device specific information in a database is able to support both authentication formats for different devices.

Yet another example of supporting different encryption formats is where encryption device 212 may be able to accept, for example, 64 byte keys, if the keys are split in a particular format defined by a key component identifier, key identifier and key content. Encryption device 214 may be able to accept keys that may be greater than 64 bytes in a format that provides a total length of the key, key identifier and key content. CKM 200 uses format information for each device and is able to provide encryption keys in both these formats, regardless of the format used by CKM 200 for storing encryption keys.

In one embodiment, agent 322 is executed at each encryption device 212, 214 and 216 to communicate with CKM 200. Agent 322 may be a software layer for all encryption devices. Agent 322 communicates with CKM 200 in a standard format that CKM 200 and each of the encryption devices can understand. The format is described below in detail. Because agent 322 and CKM 200 can effectively communicate using the standard format, CKM 200 does not have to be customized based on individual encryption device properties/environment.

Agent 322 interfaces with protocol parser 302 of CKM 200 regardless of the operating environment of encryption device 212, 214 and 216. Protocol parser 302 performs various functions that are described below in detail.

CKM 200 may also include two crypto-modules, a base crypto-module 304 and an auxiliary crypto module 306. The base crypto-module 304 performs a first level of encryption while the auxiliary crypto-module 306 performs a second level of encryption, as described below. In one embodiment, the second encryption level (e.g. 256 bits) is stronger than the first encryption level (for example, 128 bits). In one embodiment, the crypto-modules are based on hardware, software, or a combination thereof. In another embodiment, a single hardware based crypto-module may be used to perform different levels of encryption.

CKM 200 may also include a system a management layer 308 that is used to perform client configuration and overall CKM 200 operations.

CKM 200 may further include a hierarchical synchronization engine 310 (may also be referred to as HSE 310). HSE 310 interfaces with other peer CKMs, for example, 318 and 320 to replicate and backup keys 107 based on a key group sharing label and overall hierarchy, described below in detail.

To efficiently manage keys from various clients/device, CKM 200 maintains a secure database 312 at a memory 315. In one embodiment, database 312 may include a configuration database 314 and a key database 316. Configuration database 314 stores configuration information for different encryption devices (or clients) as described below. Key database 316 stores Key Objects with various fields, as described below.

Figure 3B:
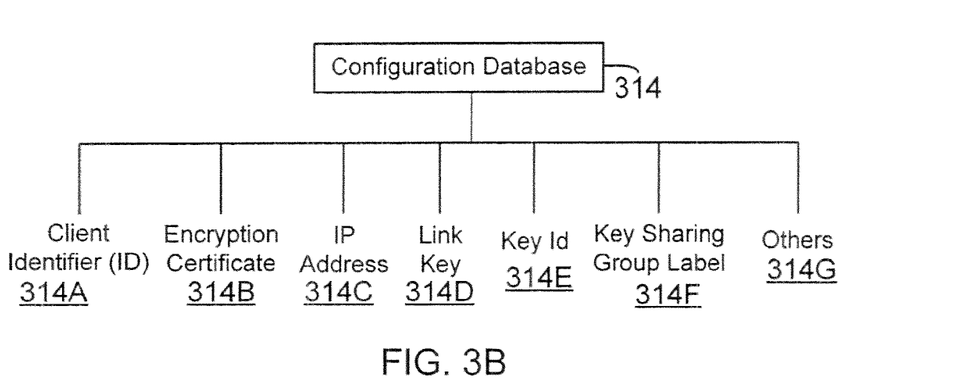
FIG. 3B shows an example of configuration database fields, according to one embodiment.

Configuration Database: FIG. 3B shows an example of configuration database 314 with a plurality of fields (314A-314G), according to one embodiment. Configuration database stores information regarding authorized clients (i.e. encryption devices 212-216). For example, configuration database 314 stores information regarding what encryption key types an encryption device can understand; what keys types may be presented in a particular format; what wrapping key types may be used to wrap encryption keys stored by CKM 200; and what type of wrapping keys the encryption devices can access. This allows CKM 200 to distribute keys to a plurality of clients in different formats that may be independent of the encryption key formats, as described below.

In one embodiment, CKM 200 using configuration database 314 is able to handle different key management policies based on different client needs. Configuration database 314 stores various client policies that define how encryption keys are to be handled. The policies are securely backed up at a secure location (not shown).

Some of the fields of configuration database 314 are now described below in detail:

Field 314A is a client identifier value that identifies a client, for example, encryption device 212. Field 314B stores an encryption certificate 314B that provides evidence of a secure connection with a client (for example, a Secured Socket Layer (SSL) certificate). Field 314C is the Internet Protocol ("IP") address of the client.

Field 314D is a link key that is used to establish secured connection with a client, as described below. Field 314D may also be used to identify a "vault key" that is used to encrypt an encryption key received from a client. The vault keys are stored in key database 316, described below. Field 314E stores a key identifier (Key ID) that is used to search for stored keys.

Field 314F is a key sharing group label for each encryption device. The key sharing group label includes permissions and access information for different entities (or nodes, described below with respect to FIG. 5) based which encryption Key Objects are replicated and shared. As described below, CKM 200 uses the key sharing label to replicate a Key Object and grants access to the replicated Key Object to one or more authorized node.

Field 314G may be customized for individual clients for storing client specific information. For example, field 314G may store information regarding whether checksum code is to be used for a particular encryption device. Field 314G may also store information regarding a type of authentication code that may be used to sign a stored Key Object. Field 314G may further include format information for presenting a Key Object to an authorized client.

Figure 3C:
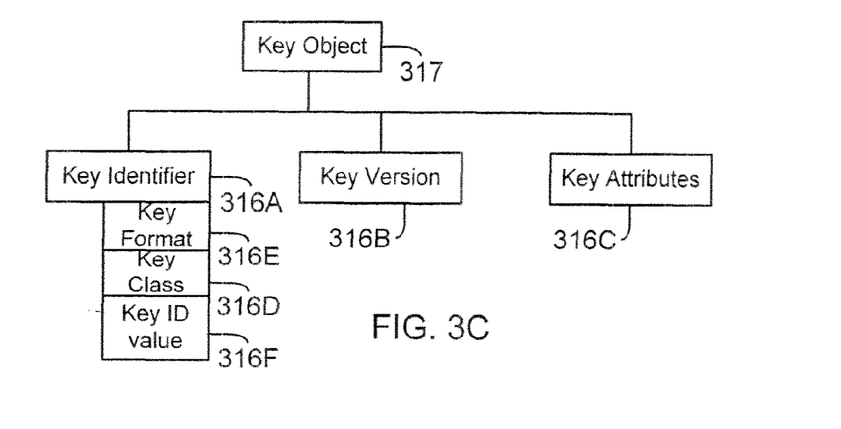
FIG. 3C shows an example of Key Object fields, according to one embodiment.

Key Object:

FIG. 3C shows high level block diagram of a Key Object 317 that may be stored in key database 316, according to one embodiment. Key database 316 may store a plurality of Key Objects 317 with various fields/parameters. For example, Key Object 317 may include a key identifier (also referred to as "Key ID") 316A, a key version 316B and key attributes 316C.

Key ID 316A may include (a) a key class identifier value 316D that identifies the type of key within Key Object 317; (b) a key Format field 316E that identifies key wrapping, for example: plain text, encrypted with a Link Key, as described below; and (c) a key identifier value 316F that uniquely identifies the Key Object 317.

The value of the key version 316B is a current revision number of the Key Object 317, i.e. it represents how many times the Key Object 317 may have been modified since it was originally inserted into key database 316.

Key Object 317 also includes various key attributes 316C. A key attribute is a name/value pair attached to a specific Key Object 317. The attribute includes: a name of the key attribute and a value for the key attribute.

As an example, using the C programming language, a Key Object and Key Attribute may be defined as follows:

```
struct KeyObject {
    uint64_t        keyversion;
    uint8_t         keyclass[256];      /* NULL terminated string */
    uint8_t         keyformat[256];     /* NULL terminated string */
    uint32_t        keyid_size;
    uint8_t         keyid[32];
    uint8_t         num_attributes;
    struct KeyAttribute attribute_list[24];
};
struct KeyAttribute {
    uint8_t         name[32];           /* NULL terminated string */
    uint32_t        value_size;
    uint8_t         value[256];
};
```

The key class (316D)/key format (316E)/Key ID value 316F are used to retrieve a Key Object that may be stored in key database 316. Jointly the fields may be referred to as a Key Object descriptor. Agents 322 shown in FIG. 3A and CKM use a same format for the Key Object descriptor fields. The format for the Key Object descriptor fields may be standardized by an industry group. This will allow different vendors that provide different encryption devices to provide a standard agent 322. This allows CKM 200 to interface with different encryption devices regardless of the format used by the encryption devices.

In one embodiment, key class 316D is a type of key that identifies a class. The class name is unique and adheres to a consistent naming convention so that different clients can interface with CKM 200 without using dedicated key managers.

Key format 316E is a format that is used for "wrapping" a Key Object received from a client, as described below. The format name applies to a specific class and hence is unique within that class. The format for key format 316E is similar to key class 316D.

Key attributes 316C are used to store a wide variety of information regarding the clients. Key attribute 316C are used to define how a Key Object is wrapped. This allows any client with agent 322 to store unique Key Objects in database 312. Key Objects may share the same key class, key format and key ID values, but have different key attribute fields indicating a different wrapping process. Some of the attributes are provided below in Table I:

| Name | Display Name | Type | Primary Key | Auto | Description |
|---|---|---|---|---|---|
| Key_classname | Key Type | Unicode string | Yes | No | Specifies Key Type |
| Key_formatname | Key Format | Unicode string | Yes | No | Specifies format of the key |
| Key_IDvalue | Key ID | 32 byte string | Yes | No | Key identifier value |
| WrappingKeyClassname | Wrapping Key Type | Unicode string | Yes | No | Type of wrapping key, If present |
| WrappingKeyIDValue | Wrapping Key ID | 32 byte string | Yes | No | Identifier for a wrapping key, if present |
| key_content | Key Content | hexBinary | false | No | Identifies a key data in a Key Object. The key content is encrypted using encryption mode before it is stored in database 312. |
| create_time | Creation Time | longUnixTime | False | No | The creation time of a Key Object 317. |
| expire_time | Expiration Time | longUnixTime | False | No | Time expired, after which the Key Object 317 may not be used to encrypt data. |
| purge_time | Purge Time | longUnixTime | False | No | Time after which the Key Object 317 may be purged from database 312. |
| Storage_type | Storage Type | string | False | No | Type of Storage, e.g. NAS, iSCSI, FC disk, SCSI disk, Tape, Pool |
| storage_server_name | Server Name | string | False | No | NAS Hostname of server |
| storage_share_name | Share Name | string | False | No | NAS Name of share |
| Storage_path | Path | string | False | No | NAS Relative path to share name |
| storage_target_name | Target Name | string | False | No | iSCSI Name of Target |
| storage_initiator_name | Initiator Name | string | False | No | iSCSI Name of Initiator |
| Storage_port_wwn | Port WWN | string | false | No | Fibre Channel or SCSI World Wide |

-continued

| Name | Display Name | Type | Primary Key | Auto | Description |
|---|---|---|---|---|---|
| Storage_host_wwn | Host WWN | string | False | No | Name identifier for Storage Side Port Fibre Channel or SCSI World Wide Name identifier for Host Side Port |
| Storage_lun | LUN | string | False | No | Fibre Channel or SCSI Logical Unit Number |
| storage_pool_label | Pool Label | string | False | No | Label of Pool |
| storage_tape_label | Tape Label | string | False | No | Label of tape media |
| owner_ip_address | Owner IP Address | string | False | Yes | The IP address of a client that created Key Object 317 |
| key_sharing_group | Key Sharing Group | string | False | Yes | The Key Sharing Group that this Key Object is associated with. |

Table I above shows six columns. The first column provides the name of a Key attribute 316C. The second column displays how the key attributes are displayed. The key attribute "Type" is stored in the third column.

The fourth column shows whether the attribute is a "primary" attribute. If an attribute is marked primary, then the key manager will ensure uniqueness for this attribute. All attributes may be used to search database 312, but if a search is conducted on non-primary attributes, more than a single key may be returned. One primary attribute is a set of fields that includes key class name, key format name and key ID). However, additional primary attributes may be specified at runtime as part of key manager customization for supporting a wide array of client needs.

The fifth column of Table I indicates whether an attribute can be automatically added to a Key Object, upon creation. An automatic attribute is visible to a client. The sixth column provides a description of the stored field.

Figure 3D:
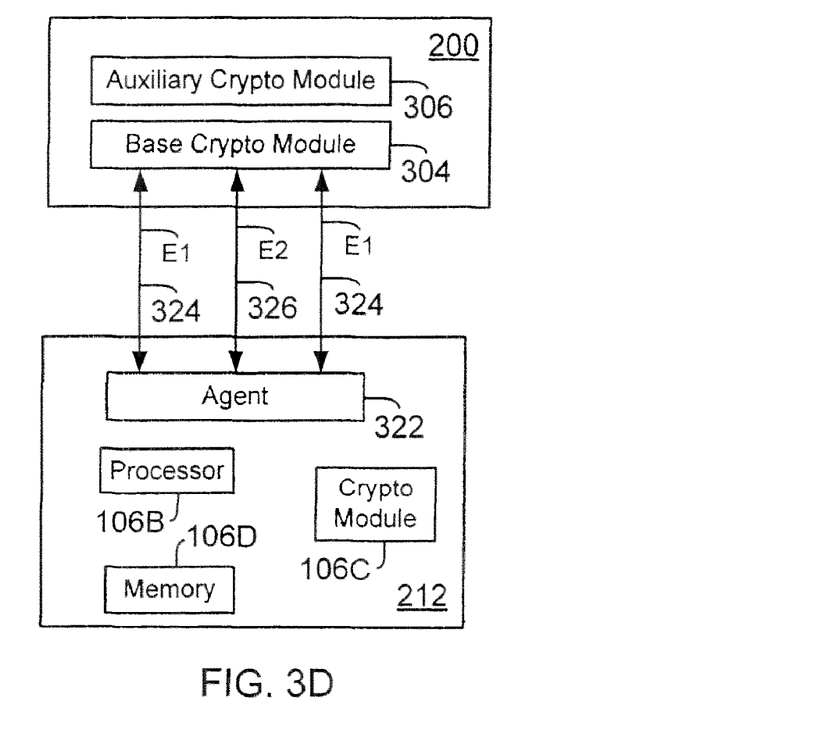
FIG. 3D shows an example of a secured connection between a CKM and an encryption device, according to one embodiment.

Before describing the use of the key attributes and how CKM 200 performs various operations, a brief description of connecting an encryption device 212 to CKM 200 is provided with respect to FIG. 3D. The methodology allows one to use a standard, secure connection that an encryption device 212 may be capable of and then use a higher strength encryption process to encrypt key contents.

Referring to FIG. 3D, an example of a secured connection between a client 212 and CKM 200 is shown, according to one embodiment. Client 212 establishes a secured connection 324 for establishing initial contact with CKM 200. Connection 324 may be a SSL connection or any other type of secured connection using an encryption algorithm of a first encryption level (shown as E1), for example, using a 128-bit encryption key. Once the Key Object is received by CKM 200, the Key Object may be protected by using a higher encryption level, for example, 256 bits-AES (Advanced Encryption Standard) based encryption. Auxiliary crypto-module 304 performs the additional encryption, by wrapping the original Key Object received from client 212. After wrapping the original Key Object, CKM 200 may use a higher strength connection (shown as E2, 326) to communicate with the client 212.

In one embodiment, encryption connections with varying strengths (E1 and E2, FIG. 3D) may be used for sending and receiving key Objects.

Using the secured connections 324 and 326, the Key Object layout as described above with respect to FIG. 32 and database 312, CKM 200 is able to perform various functions (or operations) for example, storing a Key Object, generating a Key Object, retrieving a key and replicating a Key Object. A description of the various functions is provided below:

Key Storage: A Key storage operation allows different encryption devices (212, 214, 216 and 204 (FIG. 2)) to store Key Objects 317 in database 312. When CKM 210 receives a "Key Storage" request it determines whether or not it should store the key by searching the key database 316 to determine if the database already contains a Key Object with matching Key Object Descriptor and primary Key Attribute fields. If no match is found the new Key Object is inserted into database 316. If a match is found CKM 200 deletes the old Key Object and insert a new Key Object.

Key Generation: In one embodiment, a user interface for Key Generation is provided to an authorized user (or client) for sending a request to CKM 200 to generate key. The process for enrolling an authorized client is described below. The client communicates a desired length of the encryption key as well as other attributes of the key. For example, the client may request that CKM 200 generate a key using the keyClass/keyFormat pair kcn.2001-03.com.decru:GCM-128-AES-256/kfn.200103.com.decru:generic:1.0 and CKM 200 may generate a GCM-128-AES-256 key.

In one embodiment, auxiliary crypto-module 306 may include a random number generator that can be used to generate high quality encryption keys by providing seed material to a National Institute of Standards and Technology (NIST) approved deterministic Random Bit Generator (DRBG), for example, as specified in NIST SP 800-90 and related standards, such as FIPS PUB 186-2, incorporated herein by reference in their entirety.

Figure 4:
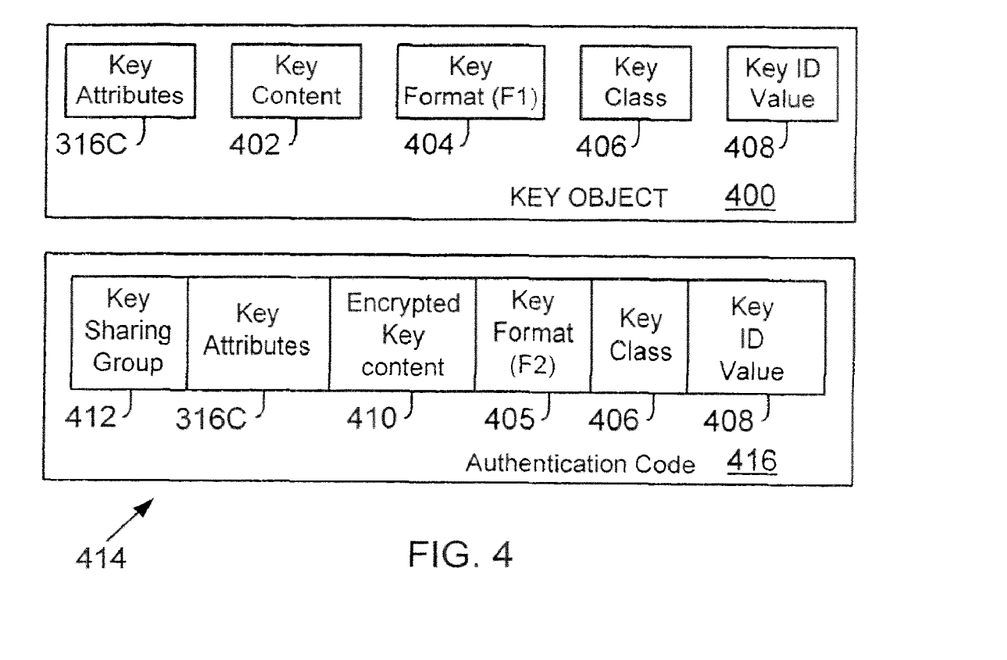
FIG. 4 shows an example of modifying a Key Object, according to one embodiment.

FIG. 4 shows an example of a generated key, according to one embodiment. A client sends a Key Object 400 to CKM 200. The Key Object 400 includes key attributes 316C, key format 404, key class 406 and a key identifier 408. The key content 402 may be encrypted or unencrypted.

CKM 200 takes Key Object 400 and produces a "wrapped Key Object" 414. CKM 200 adds a key sharing group label 412 to Key Object 400. Information within the key sharing group label specifies how a key can be shared and replicated. Auxiliary crypto-module 306 encrypts the key content 402. The nature and type of encryption may be specified by the client.

CKM 200 may also change the format of the original Key Object. The modified key format 405 information is also stored in the wrapped Key Object 414. Although only the key content is encrypted, the entire Key Object may be protected by an authentication code 416. In one embodiment, the authentication code 416 may be based on HMAC (hashed method authentication code). Authentication code 416 provides an extra layer of security for securing encrypted key content 410.

In one embodiment, vault keys from key database 316 are associated with encrypted key content, rather than any application, specific device or actual media. Hence, a user who searches for a key can simply search for a key by only having knowledge of the key ID, or possibly which data set is encrypted by the key.

Key Retrieval: An authorized client is able to retrieve a Key Object stored in key database 316 using a "Key retrieval" command. When requesting a Key Object, the client specifies a Key Class (316D, FIG. 3C), Key Format (316E), and Key ID Value (316F) to match against a key database 316 entry. The client may also specify Key Attributes 316C to search for Key Objects. Based on the client request, CKM 200 retrieves a stored Key Object.

Key Replication Status: In one embodiment, a user interface (not shown) allows a client to determine how many CKM 200 systems have replicated a Key Object. The number of replications and where the keys are replicated is set by the client, based on key sharing group label 412.

Figure 5:
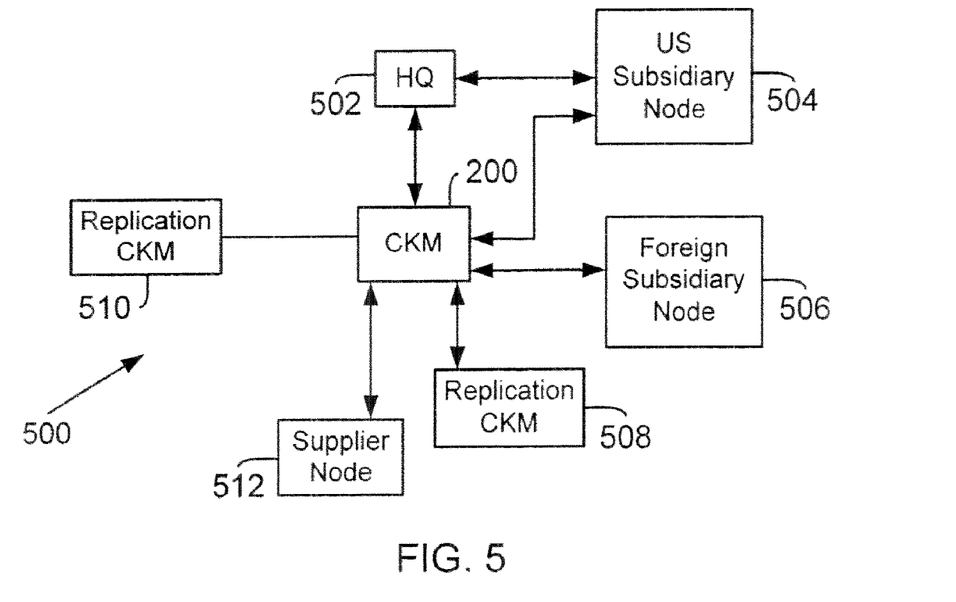
FIG. 5 shows an example of a hierarchical system that uses a policy based replication process, according to one embodiment.

FIG. 5 shows an example of a system for using the key sharing group label 412 for key replication. FIG. 5 shows a network system 500 for an enterprise. The headquarters may have a node 502 (shown as HQ 502) that is coupled to a national US subsidiary node 504 via CKM 200. The term node as used herein includes a computing system, device or any other entity that is authorized to store and access information. A foreign subsidiary node 506 is also coupled to HQ 502 via CKM 200. A supplier node 512 is coupled to the HQ 502 via CKM 200. CKM 200 is coupled to nodes 502, 504, 506 and 510. CKM 508 and 510 operate as replication units that replicate keys.

The key sharing group 412 may be based on the overall hierarchy of the organization, i.e. HQ 502 may have access to all the keys and the supplier node 512 may not be able to access any of the keys that that are generated by HQ 502. When keys are sent by HQ 502, the key sharing group label may specify that the key be replicated only at CKM 510 and may not be accessible to other nodes.

Similarly, a key from node 506 may be stored at CKM 508 and may be accessible to every other node except the supplier node 512.

In one embodiment, based on the overall hierarchy of the business organization, key replication and management may be configured using the key sharing group label 412. Key sharing group label 412 may indicate how many copies of a Key Object are to be maintained and who may have access to the stored Key Objects.

Figure 6:
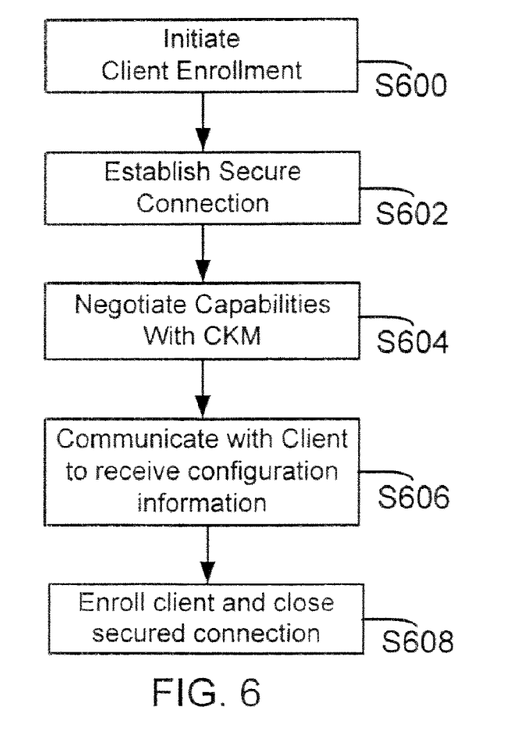
FIGS. 6-9 show various process flow diagrams, according to various adaptive embodiments of the present disclosure.

Process Flow Diagrams:

Enrollment:

FIG. 6 shows a process flow diagram for enrolling a client/encryption device/user with CKM 200, according to one embodiment. For enrollment to occur, an administrator (not shown) for CKM 200 enables enrollment by specifying a range of Internet Protocol (IP) addresses or related network identifiers belonging to the clients that seek enrollment. The administrator for each client that requests enrollment (referred to as the enrolling device) enters the network information (such as IP address and enrollment port identification information) into the enrolling device. Thereafter, the enrolling devices contact CKM 200 at a specified port, and submit their credentials (capabilities, and certificates).

CKM 200 stores the credentials for administrative approval. At a later time, CKM 200 administrator reviews the credentials and may approve the credentials in accordance with pre-defined policies. Once approved, the devices are enrolled.

The process of FIG. 6 starts in block S600 when client enrollment is initiated. The enrollment process may be initiated by an administrator for CKM 200 who specifies a range of Internet Protocol addresses or related network identifiers for the encryption devices that seek enrollment. In block S602, to register a client, a secure connection is established between CKM 200 and the requesting client. An example of the secure connection is shown as E1, 324 in FIG. 3D. In one embodiment, a SSL connection is established and a SSL certificate (314B, FIG. 3B) is uploaded to CKM 200. Using database 312, CKM 200 verifies whether the certificate is proper and whether the connection should be accepted.

In block S604, the client negotiates capabilities with CKM 200. The format of the negotiation may be set by the protocol used by the client. For example, a client may use a standard iSCSI negotiation format to negotiate with CKM 200.

in block S606, CKM 200 communicates with the encryption device. During this communication, information related to the client is sent to CKM 200 via agent 322. For example, a client identifier, IP address, an encryption certificate, key sharing group labels, format in which the client will be sending keys to CKM 200, permissions and access control information; type and level of security that the client may desire to safely protect Key Objects. The information received from the client is used to populate configuration database 314, which determines how Key Objects from the client will be handled.

In block S608, after receiving client information, client enrollment is completed and the connection is closed.

In one embodiment, the enrollment process of FIG. 6 may be performed automatically, by enabling an "auto-enrollment" mode or performed manually. During auto-enrollment, the client sends the SSL certificate in a message, which is a request for auto-enrollment. CKM 200 receives the request and sends a response to establish a connection. In one embodiment, only client's whose IP address is known to CKM 200, may request auto-enrollment. An administrator (not shown) for CKM 200 may input IP addresses that are authorized to request auto-enrollment.

Figure 7:
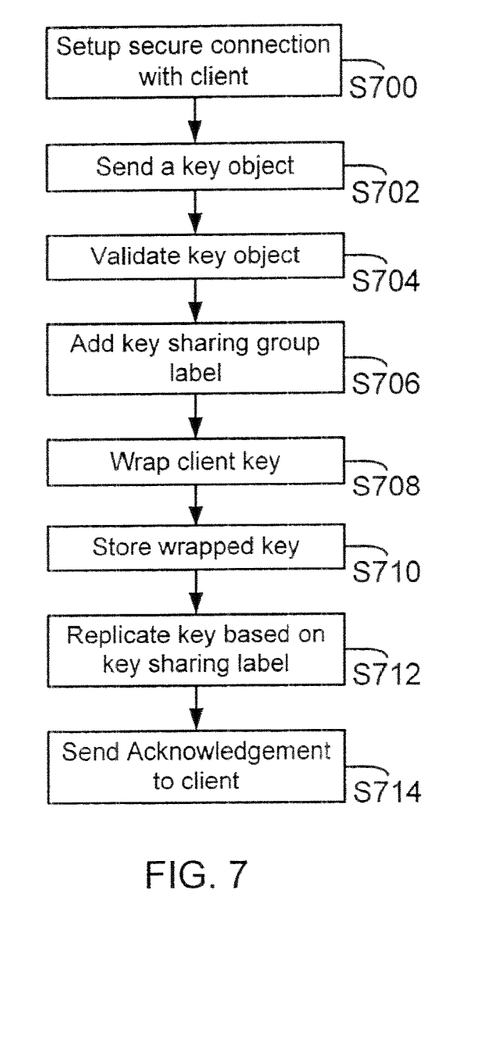

Storing a Key Object:

FIG. 7 shows a process flow diagram for storing a Key Object, according to one embodiment. The process starts in block S700 when a secure connection is established between CKM 200 and a client (for example, an encryption device 212). In block S702, the client sends a Key Object with a request to store the Key Object.

In block, S704, CKM 200 validates the client and the request. The validation ensures that only authorized requests from authorized clients are executed. In one embodiment, CKM 200 uses database 312 that includes client configuration information to verify the client and the request.

In block S706, CKM 200 adds a key sharing group label. As described above, the key sharing group label includes information regarding how a key is replicated and which entities may have the authority to access the stored keys. CKM 200 may use the information in database 314 to add the key sharing group label.

In block S708, the received Key Object is wrapped. The "wrapping" process is described below with respect to FIG. 8.

In block S710, the wrapped Key Object is stored by CKM 200.

In block S712, the wrapped Key Object is also replicated for redundancy. The wrapped Key Object is replicated based on client configuration information, i.e. the key sharing group label.

In block S714, CKM 200 sends an acknowledgement to the client, after the Key Object is replicated. The acknowledgement may be sent via a secure connection, described above with respect to FIG. 3D. It is noteworthy that the client configuration database 314 may include information as to when an acknowledgement should be send to the client, i.e., before or after a certain number of key replicates have been created.

In one embodiment, since a protocol/client independent agent 322 and a protocol/client independent Key Object format is used, CKM 200 is able to interface and store key Object for various clients that may have different/non-compatible operating environments.

Figure 8:
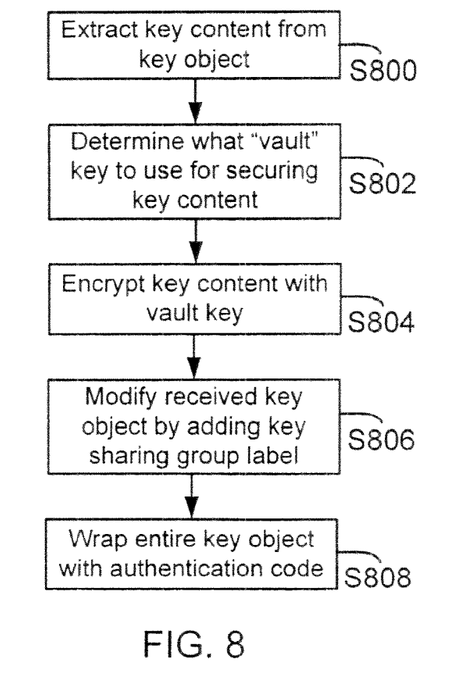

Wrapping a Key Object:

FIG. 8 shows a process flow diagram for wrapping a Key Object from a client (or encryption device), regardless of the encryption format used by the client. The process starts in block S800, when CKM 200 extracts key content (for example, 402, FIG. 4) from a received Key Object (for example, 400, FIG. 4). In block S802, CKM 200 selects a "vault" key to protect the key content. The type of vault key may be specified by a client or may be selected by CKM 200, depending on how a client is configured in configuration database 314.

In block S804, the key content is encrypted with the vault key. A key sharing group label is added to Key Object 400 in block S806 and in block S808, the entire key object is then "wrapped" by CKM 200 in an authentication code that provides an extra security layer for the stored Key Object.

Key Distribution:

In one embodiment, a method for distributing encryption keys stored by CKM 200 is provided. CKM 200 receives a first request for presenting a stored encryption key in a first format from an authorized encryption device. It is noteworthy that the first format for presenting the encryption key may be different from a format of the stored encryption key. Using database 312, CKM 200 verifies if the first encryption device is authorized to access the stored encryption key in the first format and that the stored encryption key can be distributed in the first format.

If the first encryption device is authorized, then CKM 200 prepares the encryption key so that it can be presented in the first format; and transmits the requested encryption key to the first encryption device in the first format.

CKM 200 performs the same operations to present encryption keys in a second format for a second encryption device. The second format being different from the first format.

Figure 9:
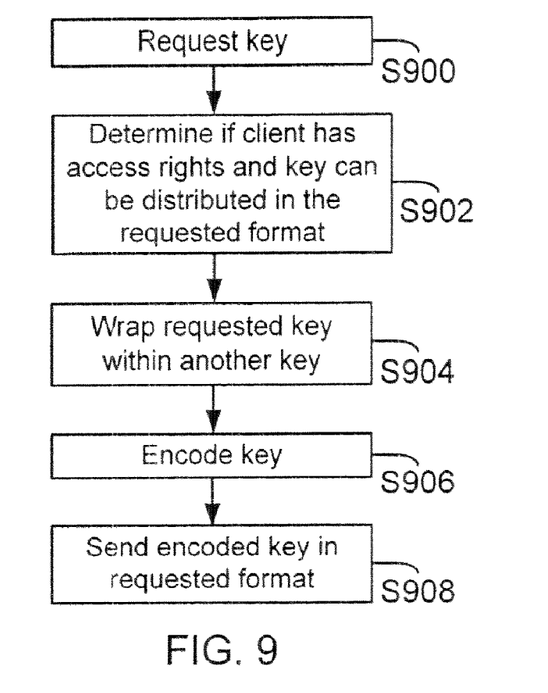

FIG. 9 shows a process flow diagram for distributing keys to clients that use different encryption formats, according to one embodiment.

The process starts in block S900, when a client requests a Key Object in a certain format. The request is received by the protocol parser 302 (FIG. 3A) that has the ability to interface with agents 322 that are executed at each client.

In block S902, CKM 200 verifies if the requesting client has access to the requested Key Object. This may be determined by checking the configuration database 314. CKM 200 also verifies if it can transmit the Key Object in the requested format.

If the client has access and distribution in the requested format is possible, then CKM 200 may encrypt (or wrap) the requested Key Object content using an appropriate wrapping key. In one embodiment, the key content is wrapped using a vault key that is stored in CKM database 312. Thereafter, in block S906, the Key Object is encoded, in one embodiment, a HMAC is added to the Key Object. Thereafter, in block S908, the encoded Key Object is sent to the client.

Figure 10:
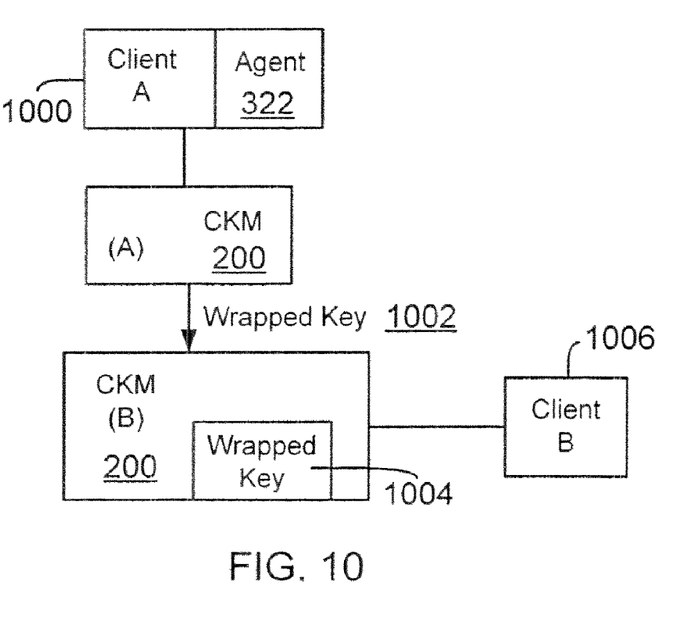
FIG. 10 shows an example of a system using the key distribution process of FIG. 9, according to one embodiment.

In one embodiment, key distribution is enabled between clients/CKMs, regardless of whether they can understand each other's encoding. For example, as shown in FIG. 10, a key may be stored by Client A (1000) in a first CKM 200 (shown as CKM (A)). The wrapped key 1002 is replicated by a second CKM (shown as CKM B) and stored as wrapped key 1004. Wrapped key 1004 may be retrieved by Client B 1006 even if Client A and B do not know or understand each others key formats.

In one embodiment, a method for distributing encryption keys stored by a CKM (200) operationally coupled to at least a first encryption device (for example, 212, FIG. 3A) and a second encryption device (for example, 214, FIG. 3A) is provided. The stored encryption key is prepared such that the requested encryption key is presented to the first encryption device in a first format (for example, 314G, FIG. 3B and key format information as part of attributes 316C, FIG. 3C), in response to a request from the first encryption device for an encryption key stored by the CKM and based on a first attribute (for example, key format name, See Table 1 above) from among a plurality of attributes (316C, FIG. 3C), associated with the first encryption device.

If the first encryption device is authorized to receive the stored encryption key in the first format, then the requested encryption key is transmitted to the first encryption device in the first format.

In yet another embodiment, a method for distributing encryption keys stored by the CKM (for example, 200, FIG. 3A) operationally coupled to at least a first encryption device (for example, 212, FIG. 5A) and a second encryption device (for example, FIG. 3A) is provided. In response to a request from the first encryption device for an encryption key stored by the CKM, the requested encryption key is wrapped (See FIG. 8) with a key stored in a CKM database (for example, 316, FIG. 3A). The key used for wrapping the requested encryption key is selected based on a first attribute (for example, wrapping key ID value, as described above in Table I) associated with the first encryption device. If the first encryption device is authorized to receive the stored encryption key in the first format (for example, 314G, FIG. 3B and key format information as part of attributes 316C, FIG. 3C), then the requested key is transmitted to the first encryption device in the first format.

The CKM uses a key sharing group label (314F, FIG. 3B), a second attribute associated with the first encryption device, to replicate and share the requested encryption key.

The CKM performs the foregoing steps in response to a second request from the second encryption device for another stored encryption key in a second format (for example, 314G, FIG. 3B and key format information as part of attributes 316C, FIG. 3C).

In yet another embodiment, a method for storing encryption keys with a CKM (for example, 200, FIG. 3A) operationally coupled to at least a first encryption device (for example, 212, FIG. 3A) and a second encryption device (for example, 214, FIG. 3A) is provided. The method includes:

(a) inserting a key sharing group label (for example, 412, FIG. 4) in an encryption key object (for example, 400, FIG. 4) received by the CKM from the first encryption device, based on which the received encryption key object is replicated and shared (See FIG. 5 for examples);

(b) wrapping the encryption key object based on configuration information (for example, 314D, FIGS. 3B and 316C, FIG. 3C) stored for the first encryption device; and (c) storing the encryption key object in a first format (for example, 314G, FIG. 3B and key format information as part of attributes 316C, FIG. 3C) information as defined by the configuration information.

In another embodiment, a method is provided. The method includes:

(a) registering (See FIG. 6 described above) a first encryption device and a second encryption device with a CKM for storing and retrieving encryption keys. The first encryption device uses a first format to encrypt data stored at a storage device; and the second encryption device uses a second format to encrypt data stored at the storage device;

(b) storing configuration information regarding the first encryption device and the second encryption device, including (i) a key sharing group label based on which a stored encryption key object is replicated and shared; and (ii) information regarding a type of key that the CKM uses to encrypt encryption key content received from the first encryption device and the second encryption device;

(c) inserting the key sharing group label in an encryption key object received by the CKM from each of the first encryption device and the second encryption device;

(d) wrapping the encryption key object received from the first encryption device and the second encryption device, based on configuration information stored for the first encryption device and the second encryption device; and (e) storing the encryption key objects received from the first encryption device and the second encryption device, in different formats.

In one embodiment, a CKM is provided that may use a standard key version, a key class name, a key format name, key identifiers and key attributes to communicate with different encryption devices. Dedicated, proprietary key management solutions for different encryption devices are no longer needed. This saves cost in managing keys and hence reduces the overall cost of securing data.

In another embodiment, the CKM uses a vault key to encrypt key content. The vault keys are associated with the data that is encrypted, rather than any application, specific device or actual media. Hence, a user who searches for a key can simply search for a key by using information regarding the stored data.

In yet another embodiment, the CKM uses at least two cryptographic modules that can provide varying degree of protection for protecting keys. The level of protection may be defined by a client. This makes the CKM flexible in handling different types of keys with different levels of protection.

In yet another embodiment, the CKM communicates with a plurality of encryption devices regardless of what encryption format the different encryption devises use to encrypt information. Dedicated, proprietary key management solutions for different encryption devices are not needed. This saves cost in managing keys and hence reduces the overall cost of securing data.

In yet another embodiment, using key sharing labels, the CKM is able to handle different level of permissions for stored keys. Access to stored keys may be based on a hierarchical system that may be similar to a way a business entity is organized.

In another embodiment, keys are automatically stored, replicated and retrieved regardless of what encryption format is used by the encryption device. This makes the overall key management process efficient.

While the present disclosure is described above with respect to what is currently considered its preferred embodiments, it is to be understood that the disclosure is not limited to that described above. To the contrary, the disclosure is intended to cover various modifications and equivalent arrangements within the spirit and scope of the appended claims.

What is claimed is:

1. A machine implemented method, comprising:
   executing an agent at a first encryption device and a second encryption device for communicating with a centralized key manager (CKM) for sending and receiving encryption key objects in a same format while using different encryption key types for encrypting information, where the format of the encryption key objects used by the agent and the CKM to communicate includes an encryption key format identifying a format for wrapping encryption key objects by the CKM and a plurality of attributes of the encryption key objects used by the CKM to process the encryption key objects;
   storing configuration information regarding the first encryption device and the second encryption device by the CKM for processing encryption key objects received from the first encryption device and the second encryption device;
   wherein the configuration information includes a key sharing group label based on which the encryption key objects are replicated by the CKM and shared between other entities; policies that define encryption key management for the first encryption device and the second encryption device; and
   format information for presenting the encryption key objects to the first encryption device and the second encryption device;
   inserting a key sharing group label by the CKM in an encryption key object received by the CKM from the first encryption device, based on which the received encryption key object is replicated a certain number of times and shared;
   wrapping the encryption key object by the CKM based on the configuration information stored for the first encryption device;
   wherein the wrapped encryption key object includes encrypted key content and an indicator indicating a format of the wrapped encryption key object; and
   storing the wrapped encryption key object by the CKM using a format defined by the configuration information;
   wherein the encryption key object is received from the first encryption device over a secure connection using a first encryption level; and
   the CKM encrypts content of the encryption key object using a second encryption level, the second encryption level being higher than the first encryption level.

2. The method of claim 1, wherein the first encryption device and the second encryption device are enrolled with the CKM using an enrollment process during which the CKM obtains the configuration information regarding the first encryption device and the second encryption device.

3. The method of claim 2, wherein the enrollment process is initiated based on Internet Protocol addresses of the first encryption device and the second encryption device.

4. The method of claim 1, wherein some of the plurality of attributes is identified as a primary attribute maintained by the CKM, such that each primary attribute has a unique value used by the CKM to search a data structure storing encryption key objects.

5. The method of claim 1, wherein the first encryption device and the second encryption device are coupled to a storage system and encrypt data before data is stored by the storage system.

6. The method of claim 5, wherein the encryption key objects received from the first encryption device and the second encryption device includes encryption keys to encrypt the data.

7. A machine implemented method, comprising:
registering a first encryption device that uses a first format to encrypt data and a second encryption device that uses a second format to encrypt data with a centralized key manager (CKM) that manages encryption key objects for the first encryption device and the second encryption device each executing an agent for communicating with the CKM for sending and receiving the encryption key objects in a same format while using the first format and the second format to encrypt data, where each encryption key object includes an encryption key format identifying a format for storing encryption key objects by the CKM;
storing configuration information regarding the first encryption device and the second encryption device for processing encryption key objects received from the first encryption device and the second encryption device by the CKM,
wherein the configuration information includes (i) a key sharing group label based on which a stored encryption key object is replicated a certain number of times and shared by the CKM with other entities;
(ii) information regarding a type of key that the CKM uses to encrypt encryption key content received from the first encryption device and the second encryption device;
(iii) policies that define key management for the first encryption device and the second encryption device; and
(iv) format information for presenting an encryption key object to the first encryption device and the second encryption device;
inserting the key sharing group label by the CKM in an encryption key object received by the CKM from each of the first encryption device and the second encryption device;
wrapping the encryption key object received from the first encryption device and the second encryption device by the CKM, based on the configuration information stored for the first encryption device and the second encryption device;
storing the encryption key objects received from the first encryption device and the second encryption device, in different formats by the CKM;
wherein the encryption key objects from the first encryption device and the second encryption key device are received over a secure connection using a first encryption level; and
the CKM encrypts content of the encryption key objects using a second encryption level, the second encryption level being higher than the first encryption level.

8. The method of claim 7, wherein each encryption object includes a key version number indicating a number of times an encryption object has been modified.

9. The method of claim 7, wherein each encryption key object includes a plurality of attributes that are used by the CKM for processing encryption key objects that are received from the first encryption device and the second encryption device.

10. The method of claim 9, wherein some of the plurality of attributes is identified as a primary attribute maintained by the CKM, such that each primary attribute has a unique value used by the CKM to search a data structure storing encryption key objects.

11. The method of claim 7, wherein the first encryption device and the second encryption device are coupled to a storage system and encrypt data before data is stored by the storage system.

12. The method of claim 7, wherein the encryption key objects received from the first encryption device and the second encryption device includes encryption keys to encrypt the data.

13. A machine implemented method, comprising:
receiving a first encryption object from a first encryption device coupled to a centralized key manager (CKM), where the first encryption object includes an encryption key format identifying a format for wrapping the first encryption key object; and
a plurality of attributes of the first encryption key object used by the CKM to process the encryption key object;
receiving a second encryption object from a second encryption device coupled to the CKM centralized key manager (CKM) where the second encryption object includes an encryption key format identifying a format for wrapping the second encryption key object; and
a plurality of attributes of the second encryption key object used by the CKM to process the second encryption key object;
wherein the first encryption device and the second encryption device each execute an agent to communicate with the CKM in a same format while using different encryption key types for encrypting information before it is stored by a storage server;
inserting a first key sharing group label by the CKM in the first encryption key object based on configuration information of the first encryption device maintained by the CKM;
wherein the first key sharing group label is used to determine replication of the first encryption key object for a certain number of times and sharing with any other entity;
inserting a second key sharing group label by the CKM in the second encryption key object based on configuration information of the second encryption device maintained by the CKM;
wherein the second key sharing group label is used to determine replication of the second encryption key object for a certain number of times and sharing with any other entity;
wrapping the first encryption key object by the CKM based on the configuration information stored for the first encryption device;
wherein the wrapped encryption key object includes encrypted key content and an indicator indicating a format of the wrapped first encryption key object;
wrapping the second encryption key object by the CKM based on the configuration information stored for the second encryption device;
wherein the wrapped encryption key object includes encrypted key content and an indicator indicating a format of the wrapped second encryption key object;
transmitting the first encryption key object by the CKM to a recipient authorized to receive the first encryption key object in the first format; and transmitting the second encryption key object by the CKM to a recipient authorized to receive the second encryption key object in the second format;

wherein the first encryption key object is received over a secure connection using a first encryption level; and the CKM encrypts content of the first encryption key object using a second encryption level, where the second encryption level is higher than the first encryption level.

14. The method of claim 13, wherein the first encryption device and the second encryption device are enrolled with the CKM for storing and retrieving encryption key objects.

15. The method of claim 13, wherein in response to a request from the first encryption device, the CKM presents the first encryption key object in the first format to another CKM that presents the first encryption key object to another encryption device in a format that is different from the first format.

16. The method of claim 13, wherein some of the plurality of attributes of the first encryption key object are identified as a primary attribute having a unique value.

17. The method of 16, wherein the primary attribute is used by the CKM to search for the first encryption key object when stored and maintained by the CKM.

18. The method of claim 13, wherein the first encryption device and the second encryption device are coupled to a storage system and encrypt data before data is stored by the storage system.

19. The method of claim 18, wherein the first encryption key object includes an encryption key that is used by the first encryption key device to encrypt the data.

* * * * *